March 24, 1959     A. GELARDIN     2,879,315
VENTED SEALED DRY CELL CONSTRUCTION
Filed June 14, 1955     2 Sheets-Sheet 1
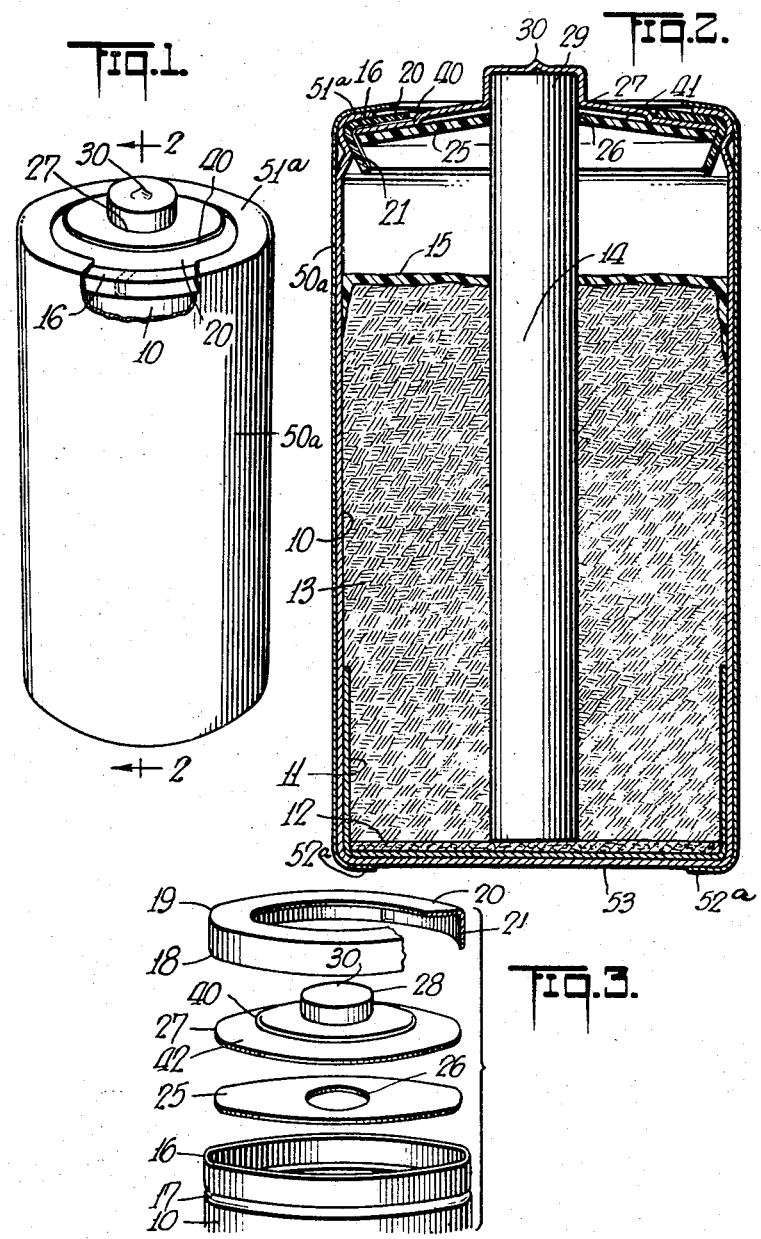
INVENTOR
ALBERT GELARDIN
BY
ATTORNEY

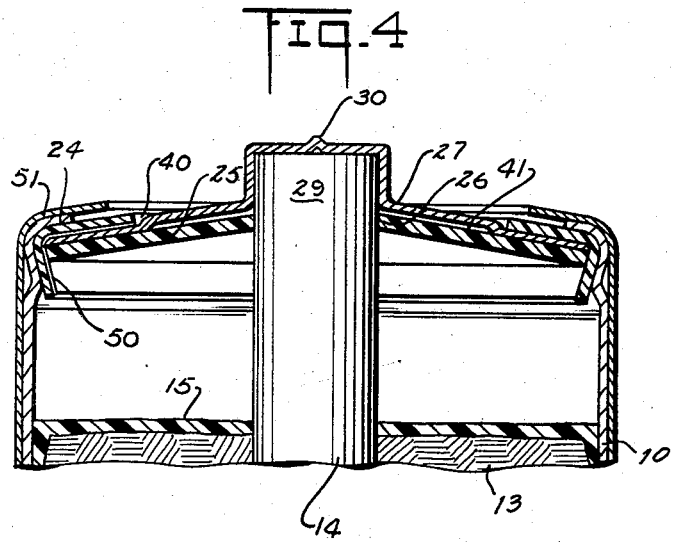
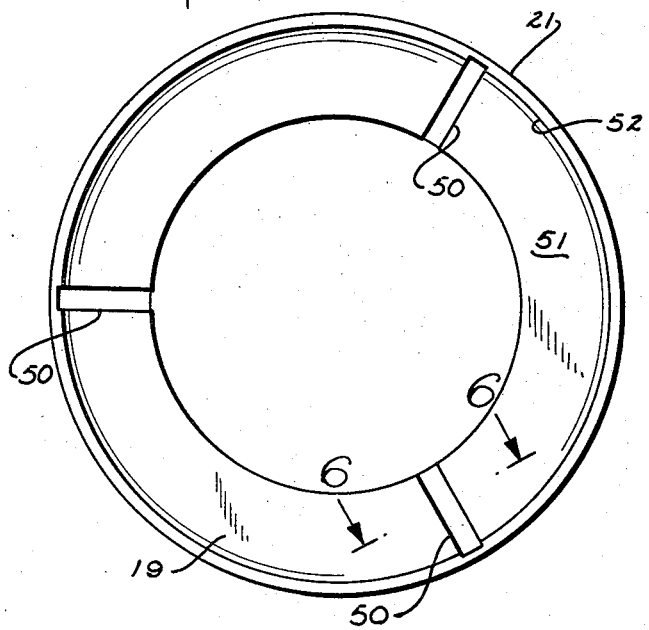
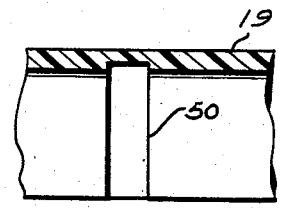

United States Patent Office 2,879,315
Patented Mar. 24, 1959

2,879,315

VENTED SEALED DRY CELL CONSTRUCTION

Albert Gelardin, New York, N.Y.

Application June 14, 1955, Serial No. 515,344

2 Claims. (Cl. 136—133)

The present invention relates to a sealed battery construction, and it particularly relates to a small-size dry cell battery of the type used for flashlights.

It is among the objects of the present invention to provide a simple sealed battery construction which may be readily manufactured by unskilled labor and which will be produced with assurance of long life.

Another object of the present invention is to make a battery construction which, with the use of relatively few parts, will be substantially automatically self-sealing incidental to manufacture and assembly thereof without special sealing operations.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory to provide a metal or zinc can for the battery, which will have a beading or inwardly directed ridge around the upper periphery thereof, which will serve to cam inwardly or to cause folding of a plastic sealing ring which will be dropped into the top of the can after filling of the electrolyte mixture therein.

This ring is desirably of L-shaped cross-section with a top horizontal flange and a vertical downwardly directed flange, which will first rest upon the bead or ridge and will then be folded inwardly to form a seal around and on both sides of the top metal plate which holds the upper end of the central carbon in position.

The particular feature of the present invention resides in the provision of one or more radial grooves which permit the egress of any gases which may accumulate on the interior of the dry cell.

Desirably, there is also assembled with the top metal plate a plastic or fiber disc which also will be enclosed and secured by the in-turned circular plastic sealing ring.

Then the entire battery may be enclosed by an insulating sleeve which will closely hug the periphery of the can and also be flanged over the top and bottom of the cylindrical battery or dry cell assembly.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings, wherein like reference characters denote corresponding parts throughout the several views:

Fig. 1 is a top perspective view, partly broken away, of one form of cylindrical dry cell construction according to the present invention.

Fig. 2 is a transverse vertical longitudinal section view of the battery upon the line 2—2 of Fig. 1 and upon an enlarged scale as compared to Fig. 1.

Fig. 3 is an exploded or separated perspective view showing the elements assembled to form the top battery seal.

Fig. 4 is a transverse sectional view upon an enlarged scale showing the venting grooves as applied to the sealing ring of a dry cell battery.

Fig. 5 is a bottom plan view of a sealing ring showing the grooves therethrough.

Fig. 6 is a transverse sectional view upon the line 6—6 of Fig. 5 and on an enlarged scale as compared to Fig. 5.

Referring to Fig. 2, there is shown a dry cell having the standard can of zinc 10, which has a bottom cup 11 carrying the fiber bottom disc 12.

This can is filled with a moist charge forming composition 13.

This composition surrounds the carbon electrode or pole 14.

The top of the moist mass 13 is sealed, as indicated at 15, by a plastic composition which may be poured into the can as the charge is placed therein.

The present invention is particularly directed to the sealing procedure and to the resultant seal which is formed.

It will be noted that the can initially, at its upper periphery 16 in Fig. 3 has an inwardly directed bead or ridge 17 which will act as a camming element and also as a stop for the lower edge 18 of the plastic sealing ring 19. The plastic sealing ring or deformable sealing ring 19 has a horizontal flange 20 and a vertical flange 21. It is the vertical flange 21 which is deformed inwardly to the position indicated in Fig. 2 and which forms the seal when it is pressed in position and when the upper peripheral edge 16 of the can 10 is deformed into the sealing position as indicated in Fig. 2.

Inside of the ring 19 will be the sealing fibrous or plastic disc or annulus 25 having a central opening 26 for the carbon pole 14.

There will also be the metal top plate 27 having the central dome 28 to receive the top 29 of the carbon pole 14.

This plate 27 will also have a top mount or projection 30 which forms the point of contact or connection to the carbon pole 14, and it has the shoulder 40 which will form the space 41 in the assembled construction of Fig. 2 and which will also form a recess 42 for the horizontal flange 20 of the sealing ring 19.

In assembly, the elements 27 and 25 are placed inside of the ring element 19 and this sub-assembly is then dropped into the upper end of the can 10 and onto the upper end 29 of the pole 14. Then the portion 16 of the can 10 is folded into the position of Fig. 2. This will press the flange 21 inwardly to the position of Fig. 2, as indicated, and will seal the peripheral edges of the disc 27 and the plate 25, as well as the top of the battery can 10.

As a final operation, the insulating sleeve 50a may be placed around the cylindrical can 10 and the upper edges may be folded over, as indicated at 51a and 52a, to form the completed assembly.

The contact may be had at the lower exposed can portion 53 as well as at the upper dimple portion 30.

The construction thus described will produce an effective seal and will give an exceptionally durable, moisture proof gasket effect. The sealing ring 19 may be of any flexible, non-conducting, soft, plastic material such as polyethylene.

The shoulder 40 on the disc 27 will not only locate the flange 20 of the sealing ring 19, but it will also act as a stiffener.

The insulating discs 12 and 25 may be made of asphalt impregnated paper or of vulcanized fiber.

The moist compositions 13 will be held in position and prevented from drying out, even though the dry cells be stored for long periods of time or kept without usage in flashlight structures.

The seal of the present application will substantially be automatic when the can portion 16 is rolled over without special machinery or special workmanship, and it will be particularly effective in moist or hot climates or in tropical or semi-tropical climates.

The sealing ring 19 may be moulded without any particular undercuts and in the final assembly of Fig. 2 it forms just as effective a seal as would a channel cross-section sealing ring.

The channel effect, as indicated in Fig. 2, results automatically upon completion of the assembly when the top of the can 10 is folded inwardly. Thus, a relatively simple cross-section, as indicated at 19 in Fig. 3 can be utilized to achieve the desired sealing effect.

The particular feature of the present invention is best shown in Figs. 4, 5 and 6.

In these figures there are shown the vent grooves 50 which are formed on the underside 51 and on the inside face 52 of the flange 21 of the sealing ring 19.

The vent grooves 50 are shown as being three in number, but 2, 4 or even 6, may be employed, if desired.

These grooves will vent any gases from the interior of the battery through the head space thereof, and assure that the battery will be sealed and at the same time will not accumulate any pressure.

As many changes could be made in the above sealed dry cell construction, and many widely different embodiments of this invention could be made without departing from the scope of the claims, it is intended that all matter contained in the above description shall be interpreted as illustrative and not in a limiting sense.

Having now particularly described and ascertained the nature of the invention, and in what manner the same is to be performed, what is claimed is:

1. A vented sealed dry cell battery having a cylindrical can and having an annular plastic sealing ring of inverted L-shaped cross section with a plurality of radially-extending venting grooves on the inside faces of the horizontal and vertical flanges making up the L, said battery having a peripheral ridge on its upper portion acting as a stop for said vertical flange when inserted and camming said vertical flange inwardly upon making of the seal, and an annular fibre disk and a metal top plate positioned inside of and held in position by said flange, the top end of the can being folded inwardly over said horizontal flange.

2. The battery of claim 1, said metal top plate having an intermediate ridge and a peripherally depressed portion to receive and hold in position said horizontal flange.

References Cited in the file of this patent

UNITED STATES PATENTS

| | | |
|---|---|---|
| 1,398,366 | De Olaneta | Nov. 29, 1921 |
| 1,908,194 | Stone | May 9, 1933 |
| 2,632,784 | Marsal et al. | Mar. 24, 1953 |
| 2,710,887 | Gelardin | June 14, 1955 |
| 2,740,822 | Sexe | Apr. 3, 1956 |